D. WHITMORE, Jr.
Harvester-Droppers.

No. 148,101.     2 Sheets--Sheet 1.      Patented March 3, 1874.

Witnesses:
D. P. Cowl
H. S. Miller.

Inventor:
Danl. Whitmore Jr.
per Attys
A. H. & R. K. Evans

D. WHITMORE, Jr.
Harvester-Droppers.

No. 148,101. Patented March 3, 1874.

Witnesses:
Inventor:

UNITED STATES PATENT OFFICE.

DANIEL WHITMORE, JR., OF WATERLOO, IOWA.

IMPROVEMENT IN HARVESTER-DROPPERS.

Specification forming part of Letters Patent No. 148,101, dated March 3, 1874; application filed January 29, 1874.

*To all whom it may concern:*

Be it known that I, DANIEL WHITMORE, Jr., of Waterloo, Iowa, have invented a new and useful Improvement in Harvesters, of which the following is a clear, full, and exact description, reference being had to the accompanying drawings making a part of this specification, in which—

Figure 1:
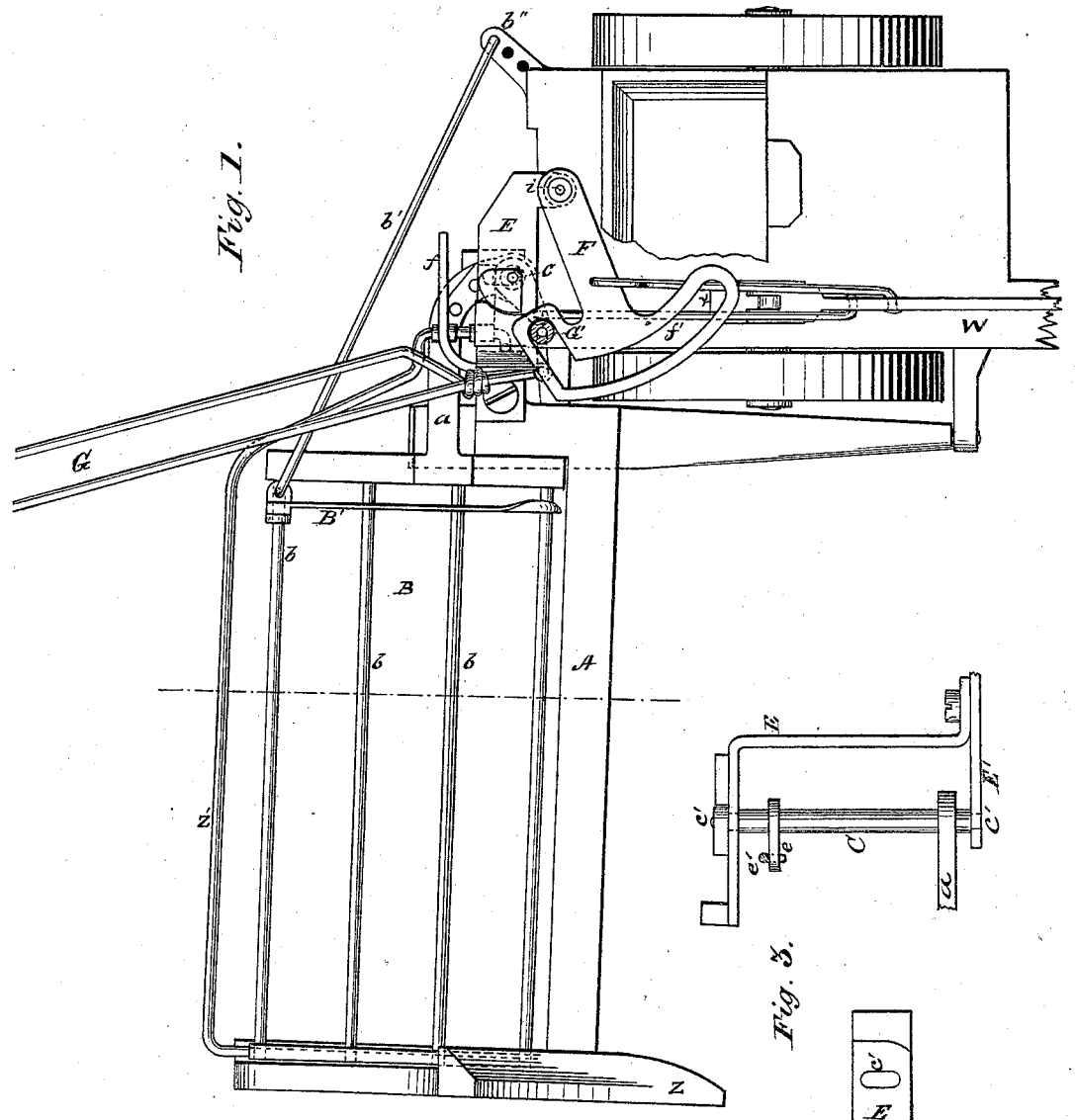
Figure 2:
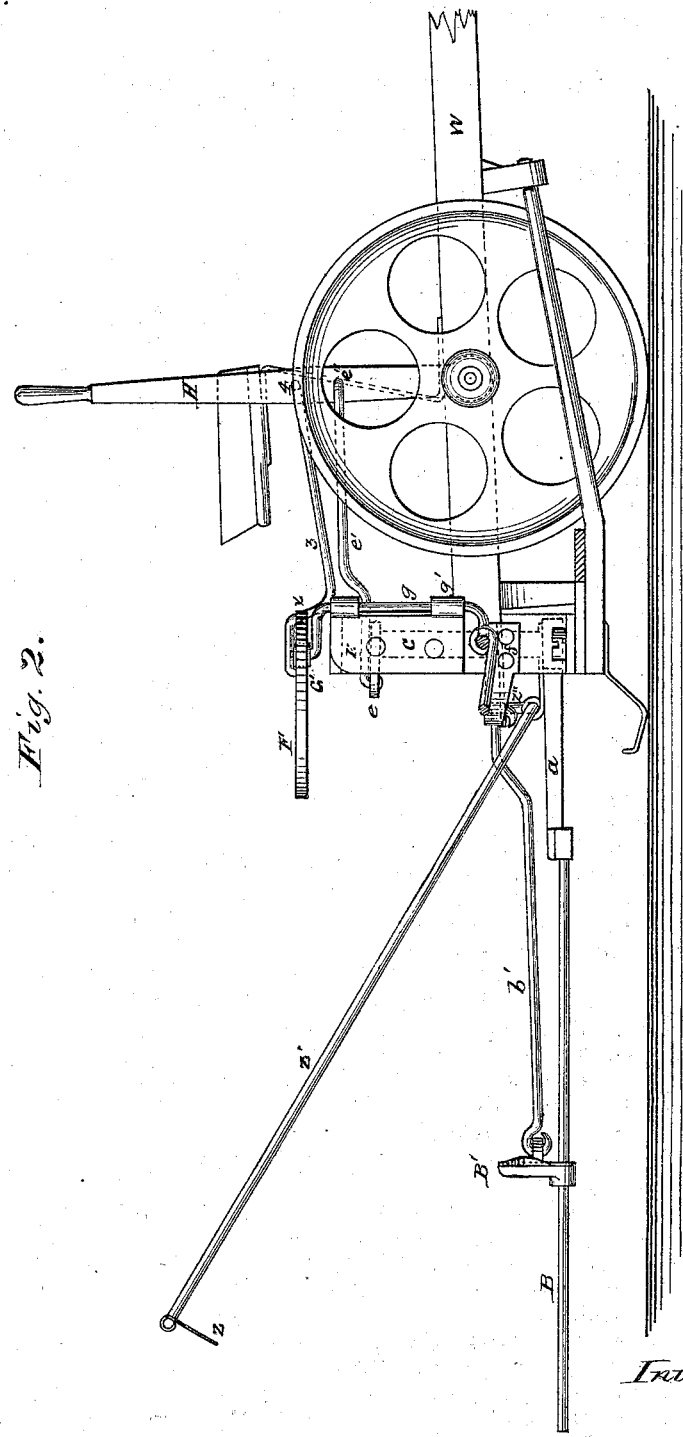

Figure 1 is a top view of my invention. Fig. 2 is a vertical longitudinal section; Fig. 3, details referred to.

My invention relates to that class of harvesters in which the driver is enabled to throw the grain behind him; and it consists in the combination and arrangement of the several parts, as hereinafter described.

In order to enable others skilled in the art to make and use my invention, I will proceed to describe the exact manner in which I have carried it out.

In the drawings, W represents the framework of an ordinary harvester, provided with a driver's seat; and A, the ordinary cutter-bar. B is a frame, provided with the fingers $b\ b$, for catching the falling grain. This frame is attached, by the arm $a$, to the rear of the frame W by means of the vertical shaft C, having its bearings at $c\ c$ in the plates E E'. On the vertical shaft C is also secured the arm $e$, to which is attached the rod $e'$, the opposite end of this rod being secured to lever-handle H at $e''$.

It is evident from this construction that, whenever the driver raises the lever-handle H, the rod $e'$ will force back the arm $e$, and this, in turn, will partially revolve the vertical shaft C, which will carry with it the frame B, and remove it to a position in the rear of the driver. By again pushing the handle forward or downward, the driver returns the frame B to its position next the cutter-bar, ready to receive another supply of grain.

B' is an automatic clearer, sliding on the teeth $b\ b$, for clearing or pushing the fallen grain to the outer end of the frame and away from the machine, so that the fingers $b\ b$ will drop it, as hereinafter explained. This clearer is secured at each end by thimbles, which slide loosely upon the outer teeth, and it is connected by the rod $b'$ to the rear part of the frame W, as shown at $b''$.

It is evident that, as the frame B is caused to swing around behind the driver, the rod $b'$ will cause the clearer B' to move forward along the teeth $b\ b$, thus pushing the grain to the outer end of the frame. The rod $b'$ may be adjusted by means of the holes at $b''$. When the frame B has reached its proper point in the rear of the driver, its outer end is allowed to drop by means of the slot in the bearing $c'$, (see Fig. 3,) which allows the vertical shaft C to fall slightly to the rear when the frame B is in a line with the line of movement of the machine; and this falling of the shaft C in the slot allows the points of the teeth to drop, so that the grain will readily pass off when pushed by the clearer B'.

On the outer end of the frame B is the guard $z$, resting upon the points of the fingers $b\ b$, and holding the grain steadily on the fingers until it reaches the proper position for removal. This guard $z$ is secured rigidly to the rod $z'$, which is bent as shown in Fig. 1, and secured by a strong thimble on the arm $a$, over which it passes, and is then turned up at a right angle at its end $z''$. (See Fig. 2.) On the lower part of the plate E is secured a short finger, $f$, curved slightly, as shown in Fig. 1, so as to partially control the movement of the rod $z'$ by catching the bent end $z''$ and bearing it off from the frame B. The result is, the end $z''$ furnishes a lever, by which, when in contact with the finger $f$, the opposite end of the rod $z'$ is raised, and with it the guard $z$.

The operation, therefore, of this part of my invention is as follows: A sufficient quantity of grain having been received on the frame B, the driver raises the handle H, which in turn swings the frame B to his rear. As the frame passes around to the rear, the clearer B' forces the grain against the outer guard $z$, and, when in the rear of the driver, the finger $f$, by means of the lever $z''$, forces up the guard $z$, while at the same time the slot $c'$ allows the point of the fingers $b\ b$ to drop and discharge the grain.

The frame B being now in the rear of the driver, and the harvester being still in motion, the grain would be liable to fall over the cutter-bar, and not only waste, but prevent the frame from coming again into its proper position, if not prevented from so doing. To accomplish this is the purpose of the fingers G. These fingers are secured to the rod $g$, bent as shown in Fig. 2, and secured by the hinge $g'$ to the plate E. On the top is placed the small friction-roller $G'$, moving in a peculiarly-shaped slot, $f'$, in the plate F, which is pivoted at $i$ on the end of the plate E. The plate F is attached by the rod 3 to the lever-handle H at 4.

It is evident from this construction that the driver, by raising or lowering the handle, can cause the fingers G to have a movement guided and controlled by the peculiar slot $f'$. When the lever-handle is down, and the frame B is in position near the cutter-bar, the fingers G are in the rear of the frame B, and the friction-roller $G'$ is in the extreme front end $x$ of the slot $f'$; but when the handle H is raised, the direction of the short arm of the slot throws the fingers G immediately to the front, to support the grain while the frame moves to the rear. The shape of the long arm of the slot is such as to hold the fingers G steadily in position until the return of the frame to its position, when the fingers, being thus relieved from duty, again fall to the rear of the platform, to await the next demand for their services.

Having thus described my invention, what I claim as new, and desire to secure by Letters Patent, is—

1. In combination with the frame B and clearer $B'$, the guard $z$, the bent rod $z'$, and finger $f$, substantially as and for the purpose set forth.

2. In combination with the frame B, the fingers G, the bent rod $g$, hinged to the plate $c$, and provided with the friction-roller $G'$, the slotted plate F, and rod 3, all constructed and operating substantially as and for the purpose set forth.

DANIEL WHITMORE, Jr.

Witnesses:
L. W. COLBY,
TITUS WHITMORE.